(12) United States Patent
Buehler et al.

(10) Patent No.: US 9,218,690 B2
(45) Date of Patent: Dec. 22, 2015

(54) METHOD FOR SIMULATING HYPERSPECTRAL IMAGERY

(75) Inventors: Eric Daniel Buehler, Grand Rapids, MI (US); Benjamin Thomas Occhipinti, Grand Rapids, MI (US); Konrad Robert Kuczynski, Grand Rapids, MI (US); Matthew James Schafer, Kentwood, MI (US)

(73) Assignee: GE AVIATION SYSTEMS, LLC, Grand Rapids, MI (US)

( * ) Notice: Subject to any disclaimer, the term of this patent is extended or adjusted under 35 U.S.C. 154(b) by 387 days.

(21) Appl. No.: 13/598,038

(22) Filed: Aug. 29, 2012

(65) Prior Publication Data

US 2014/0063009 A1  Mar. 6, 2014

(51) Int. Cl.
    *G06T 15/50*    (2011.01)
    *G06T 19/20*    (2011.01)

(52) U.S. Cl.
    CPC .............. *G06T 15/506* (2013.01); *G06T 19/20* (2013.01)

(58) Field of Classification Search
    USPC .......... 345/419, 420, 426; 356/326, 328, 300, 356/310
    See application file for complete search history.

(56) References Cited

U.S. PATENT DOCUMENTS

| | | | |
|---|---|---|---|
| 6,735,557 B1 * | 5/2004 | Castellar et al. | 703/5 |
| 7,369,229 B2 | 5/2008 | Bissett, III et al. | |
| 8,897,571 B1 * | 11/2014 | Robinson et al. | 382/191 |
| 2006/0138313 A1 * | 6/2006 | Tennant et al. | 250/226 |
| 2008/0062406 A1 | 3/2008 | Finarov et al. | |
| 2008/0088840 A1 * | 4/2008 | Bodkin et al. | 356/328 |
| 2009/0210447 A1 * | 8/2009 | Moshe | 707/103 Y |
| 2010/0056928 A1 * | 3/2010 | Zuzak et al. | 600/476 |
| 2012/0200682 A1 * | 8/2012 | Mestha et al. | 348/61 |
| 2014/0028800 A1 * | 1/2014 | Tin | 348/46 |
| 2014/0028801 A1 * | 1/2014 | Tin | 348/46 |
| 2015/0015692 A1 * | 1/2015 | Smart | 348/77 |

OTHER PUBLICATIONS

Borel, Christoph C., et al., "Multi- and Hyperspectral Scene Modeling," Algorithms and Technologies for Multispectral, Hyperspectral, and Ultraspectral Imagery XVII, May 13, 2011, pp. 1-9, Volume No. 8048, Issue No. 1.

Schott, John R., et al., "Advanced Synthetic Image Generation Models and their Application to Multi/Hyper-Spectral Algorithm Development," Proceedings of SPIE—International Society for Optical Engineering, Jan. 1, 1999, pp. 211-220, Volume No. 3584.

Borner, Anko, et al., "SENSOR: A Tool for the Simulation of Hyperspectral Remote Sensing Systems," ISPRS Journal of Photogrammetry and Remote Sensing, Mar. 1, 2001, pp. 299-313, Volume No. 55, Issue Nos. 5-6.

(Continued)

*Primary Examiner* — Kimbinh T Nguyen
(74) *Attorney, Agent, or Firm* — General Electric Company; William S. Munnerlyn

(57) ABSTRACT

A method 10 of modeling hyperspectral images includes building a scene in a first frame with objects and materials using a three dimensional modeling tool 16, selecting one or more hyperspectral bands and changing the reflectivity of each object and material 20 in the scene to correspond to reflectivity in the hyperspectral bands, changing the emissivity of a spectral source 24 for each object and material in the scene to correspond to the emissivity of the spectral source in the hyperspectral bands, rendering the scene to generate a hyperspectral image 28, and repeating the process for subsequent frames 30.

20 Claims, 1 Drawing Sheet

(56) References Cited

OTHER PUBLICATIONS

Ontiveros, Erin, et al., "Realism, Utility, and Evolution of Remotely Sensed Image Simulations", Algorithms and Technologies for Multispectral, Hyperspectral, and Ultraspectral Imagery XVII, May 13, 2011, pp. 1-9, Volume No. 8048, Issue No. 1.

Ientilucci, Emmett J., et al., "Advances in Wide-Area Hyperspectral Image Simulation," Proceedings of SPIE, Sep. 10, 2003, pp. 110-121, Volume No. 5075.

EP Search Report and Written Opinion dated Jan. 16, 2014, issued in connection with corresponding EP Application No. 13182229.8.

Dimitris Manolakis, David Marden, and Gary A. Shaw; Hyperspectral Image Processing for Automatic Target Detection Applications; Lincoln Laboratory Journal; pp. 79-116; vol. 14, No. 1, 2003.

Lockheed Martin—CameoSim—What We Do; http://www.lockheedmartin.co.uk/uk/what-we-do/products/CameoSim.html accessed from the Internet Jun. 12, 2012; 2 pages; United Kingdom.

Mochizuki et al., "3D Digital Archive of the Japanese Sword Based on Spectral Reflection Model", International Association of Societies of Design Research Conference, Coex, Seoul, Korea, Oct. 18-22, 2009.

\* cited by examiner

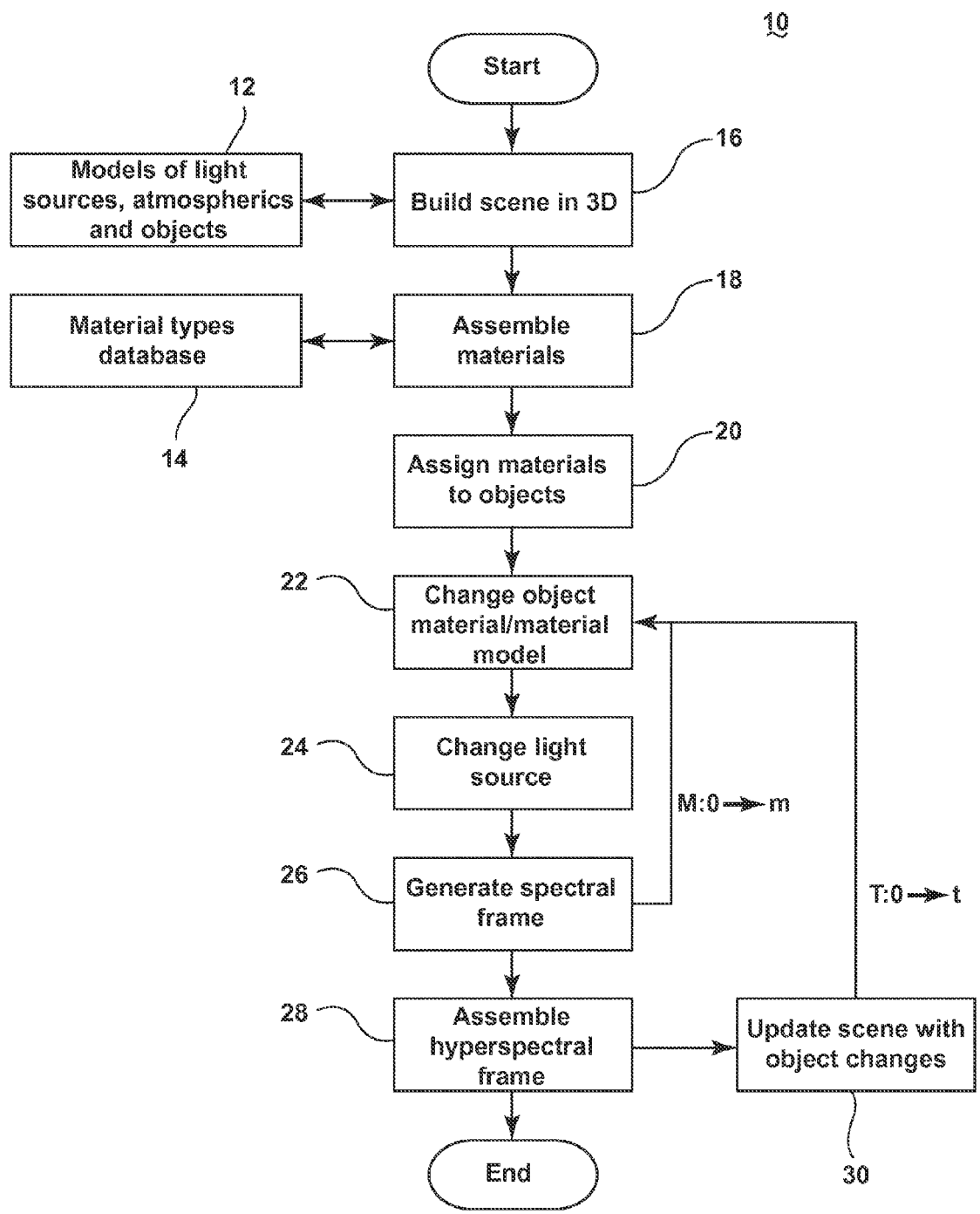

METHOD FOR SIMULATING HYPERSPECTRAL IMAGERY

BACKGROUND OF THE INVENTION

The environment of a remote sensing system for hyperspectral imagery (HSI) is well described in "Hyperspectral Image Processing for Automatic Target Detection Applications" by Manolakis, D., Marden, D., and Shaw G. (Lincoln Laboratory Journal; Volume 14; 2003 pp. 79-82). An imaging sensor has pixels that record a measurement of hyperspectral energy. An HSI device will record the energy in an array of pixels that captures spatial information by the geometry of the array and captures spectral information by making measurements in each pixel of a number of contiguous hyperspectral bands. Further processing of the spatial and spectral information depends upon a specific application of the remote sensing system.

Simulating imagery such as HSI typically consists of creating a three dimensional scene populated with three dimensional models of objects, light sources and cameras and then rendering the scene from three dimensions to a two dimensional image that displays how the objects reflect light from the light sources as viewed by the cameras.

Three dimensional models are representations of three dimensional objects whereby a collection of points are defined in three dimensional space. The representation of an object is then defined as the collection of three dimensional points and a geometric model for connecting the set of three dimensional points. Typical models used to connect these three dimensional points are triangles, lines and curved surfaces. A three dimensional scene may be constructed by establishing the geometric relationship between the modeled three dimensional objects. Well-known software tools for creating three dimensional models and scenes include Rhinoceros® 3D, Blender, Pro/ENGINEER® and OpenGL®.

Not only will a three dimensional scene have a geometrically dispersed set of models of objects, it may also have a geometrically dispersed set of light sources to provide a model of illumination. These models may represent any light source with examples ranging from the sun to the headlights of an automobile. As with actual light sources, the models of sources of illumination may have specific properties at different wavelengths. An accurate model of a light source may establish the relationship between the spectral irradiance of the source and the wavelength or hyperspectral band being modeled. A common property used to characterize and model a light source is emissivity. Emissivity is the ratio of energy radiated by a source to energy radiated by a black body object at the same temperature. For example, it is well-known that the sun may be modeled as a black body radiator with a temperature of about 5,800 K.

Many three dimensional modelers may consider the intervening medium between light sources and the objects in the scene. Incorporating atmospherics into the three dimensional scene may provide a more accurate rendering of the simulated imagery for the scene. Atmospherics are used to model the transmissivity or attenuation of light as it is transmitted from a light source to an object. Like the modeling of light sources, the model may be refined as a function of hyperspectral band. For example, it is well-known that sunlight is heavily attenuated in narrow bands in the infrared spectrum due to absorption of radiation by water and carbon dioxide in the atmosphere. A well-known tool for modeling of the atmospheric propagation of electromagnetic radiation is MODTRAN®.

Objects in the three dimensional scene may be constructed of materials that are representative of their real-world counterparts. Materials define the color, transparency, shininess etc. of the modeled object.

After the scene is populated with objects and light sources an image is generated by a process commonly known as 3D rendering. 3D rendering is a computer graphics process where three dimensional models and scenes are converted into two dimensional images that represent how the objects appear at the position of a camera that has been placed in the scene.

BRIEF DESCRIPTION OF THE INVENTION

The invention relates to a method of modeling hyperspectral images. The method comprises building a scene in a first frame with objects and materials using a three dimensional modeling tool; selecting at least one hyperspectral band; changing the reflectivity of each object and material in the scene to correspond to reflectivity in the at least one hyperspectral band; changing the emissivity of at least one spectral source for each object and material in the scene to correspond to the emissivity of the at least one spectral source in the at least one hyperspectral band; rendering the scene to generate a hyperspectral image; and repeating for subsequent frames.

BRIEF DESCRIPTION OF THE DRAWINGS

FIG. 1 is a flowchart depicting a method of modeling hyperspectral images according to an embodiment of the present invention.

DESCRIPTION OF EMBODIMENTS OF THE INVENTION

In the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include allowing designers of spectral sensors and spectral data processing systems to generate a test dataset prior to sensor availability. The method would also allow others to simulate new spectral materials and coatings while taking in account light reflections from nearby world objects.

FIG. 1 is a flowchart depicting a method of modeling hyperspectral images according to an embodiment of the present invention. The method of modeling hyperspectral images 10 may be initiated by the user by using a three dimensional modeling tool to build a scene in a first frame with objects and materials. Existing three dimensional modeling environments may be used to establish the elements of the scene and the relative locations of the objects. The conventional steps of three dimensional modeling incorporated into this method are the steps of building a representation of a scene in three dimensions at 16 that incorporates models for light sources, atmospherics and objects at 12. After building a representation of the scene in three dimensions at 16, the materials for the models of objects at 12 may be assembled at 18. The properties of these materials may be accessed from a material types database at 14. Upon assembling the materials at 18, the materials may be assigned to the objects of the scene at 20. By selecting at least one hyperspectral band, properties of the scene may be changed to adjust the scene according to the specifications of the simulation. The models for the objects and their materials may be changed at 22. Then, the properties of the light sources may be changed at 24. A spectral frame may then be generated for the scene at 26 by rendering the three dimensional scene to a two dimensional spectral frame for a specific hyperspectral band. All spectral frames for a given scene may then be assembled into a hyperspectral frame at 28. The geometry of the scene may then be updated at 30 to represent time-varying motion. Subsequent hyperspectral frames may then be generated by repeating the steps at 22, 24, 26 and 28.

To build a representation of a three dimensional scene at 16 and models for lights sources, atmospherics and objects 12, conventional three dimensional modeling techniques and tools may be employed.

Each material may have properties that may be stored in a database at 14. The properties of materials may be modeled such that a material's reflectivity is a function of the hyperspectral band of the light impinging upon it. The materials that may be assigned to a modeled object may be assembled at 20 such that an object may be modeled to be constructed of a composite of many materials.

For each hyperspectral band that may be modeled in the resulting HSI, the object and object's material model may be changed at 22. Changing the reflectivity of each object and material in the scene to correspond to reflectivity in a hyperspectral band may provide an accurate representation of how the object may reflect light from a light source.

For each hyperspectral band that may be modeled in the resulting HSI, the light source or sources may be changed at 24. The emissivity of each light source model in the scene may be changed to provide an accurate representation of how the object may emit light from a light source at a particular hyperspectral band. Changing the emissivity of each spectral source for each object and material in the scene to correspond to the emissivity of the spectral source in each hyperspectral band may provide an accurate representation of how the object may reflect light from a light source.

Generating a spectral frame at 26 may be performed after geometrically establishing the relationship between the objects and light sources and updating the emissivity of all light source models and reflectivity of all material models in the scene. A spectral frame may be generated at 26 by 3D rendering. Though the implementations for 3D rendering may vary, the process of 3D rendering may produce a two dimensional image of the three dimensional scene for a particular hyperspectral band.

The process of changing an object and material model at 22, changing a light source at 24 and generating a spectral frame at 26 for a given hyperspectral band may be repeated for all hyperspectral bands in the method of modeling hyperspectral images 10. For a set of M distinct hyperspectral bands, a spectral frame may be generated at 26 for each hyperspectral band independently resulting in M distinct spectral frames.

A hyperspectral frame may be assembled at 28 after all M spectral frames have been generated thereby rendering the scene in all M hyperspectral bands. A hyperspectral frame is a hyperspectral data cube where the rendered spatial image for each hyperspectral band may be interleaved to create a three dimensional array of values. A hyperspectral data cube is an array of values where two of the dimensions are the spatial dimensions that make an image and the third dimension is spectral such that each spatially resolved pixel is a vector of spectral values.

The scene may be updated with object changes at 30. The objects may be moved, articulated or transformed to modify the scene. To generate subsequent hyperspectral frames for a set of T distinct times, the scene may be updated followed by repeating the process of changing object and material models 22, changing light source models 24, generating spectral frames 26 and assembling hyperspectral frames 28. The process of updating the scene with object changes at 30 followed by the steps at 22, 24, and 26 needed to assemble a new hyperspectral frame at 28 may simulate motion in the modeled hyperspectral images.

Additional models for the camera's spectral response may be integrated to emulate actual sensors. For example, a real sensor configuration will have a response that will vary not only between hyperspectral bands but from pixel to pixel. Other common effects that may be modeled are sensor read noise and shot noise. Additional sensor effects may be modeled depending on the requirements of the specific implementation. Also, the rendered and assembled hyperspectral frames may be additionally processed to emulate real world data collection considerations such as the image feed packing order of the sensor. Additional real world data collection considerations may be modeled depending on the requirements of the specific implementation.

The iterated steps at 22, 24 and 26 of the method of modeling hyperspectral images occur independently for each time step and each hyperspectral band. As a result, the simulation may be performed on a computer architecture that lends itself to fast parallel computation. A parallel architecture such as a multi-core CPU or GPU may generate each of the spectral frames simultaneously and independently. Using a parallel architecture in this way may allow for the generation of all spectral frames for a hyperspectral frame to occur quickly enough such that subsequent frames can be generated in real-time.

A benefit of an aspect of the invention is for the development of remote sensing systems that records HSI. Remotely sensed HSI has proven to be valuable for wide ranging applications including environmental and land use monitoring, military surveillance and reconnaissance. The utility of the resulting HSI for these applications is highly dependent upon the algorithms used to process HSI. Algorithms used to process HSI for various applications must be accurate and robust. Consequently, the tests used to validate these algorithms must be similarly robust. One way to develop and test robust processing algorithms for HSI is to simulate a wide range of collected imagery that represents real-world scenarios both likely and unlikely to be encountered by an HSI system. Simulated HSI as can be modeled by an aspect of the invention can provide a practical alternative to actual field measurements, which are typically expensive, time-consuming and rarely cover the full range of anticipated imaging scenarios that a processing algorithm must handle in a fielded system.

Additionally, by observing differences between the hyperspectral signatures from simulated HSI and the collected real-world HSI that are not fundamental to the actual imaged object and material, a system developer can identify and classify the models for these objects and materials. The developer can refine and update either, the modeling and rendering algorithms of the simulation, the algorithms used for processing real-world HSI for identification and classification applications, or both to improve the fidelity of the simulated HSI or the results of the applications for processing real-world HSI.

In one aspect of the invention, spectral frames for 16 contiguous hyperspectral bands may be generated in real time with a time step commensurate to a video frame rate of 30 Hz. In this modality, the method of modeling hyperspectral imagery of the present invention is advantageous for the development and testing of real-time HSI systems and processing algorithms.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of modeling hyperspectral images, comprising:

using a processor to execute computer executable components stored in a memory to perform the following acts:
generating a three-dimensional scene in a first frame including generating objects and materials in the scene;
selecting a first hyperspectral band;
adjusting at least one of: a reflectivity of at least one of the objects or materials in the scene to correspond to reflectivity in the first hyperspectral band, or an emissivity of at least one spectral source to correspond to the emissivity of the at least one spectral source in the first hyperspectral band;
generating, by rendering, a first spectral frame of the three-dimensional scene;
selecting a second hyperspectral band;
adjusting at least one of: a reflectivity of at least one of the objects or materials in the scene to correspond to reflectivity in the second hyperspectral band, or an emissivity of at least one spectral source in the scene to correspond to the emissivity of the at least one spectral source in the second hyperspectral band;
generating, by rendering, a second spectral frame of the three-dimensional scene; and
assembling the first and second spectral frames into a hyperspectral frame.

2. The method of claim 1 wherein the generating the first or second spectral frame, by rendering, includes rendering the three-dimensional scene as a two-dimensional frame.

3. The method of claim 1 wherein the generating the first or second spectral frames includes changing the spectral response to model predetermined sensors.

4. The method of claim 1 wherein the first and second hyperspectral bands include contiguous hyperspectral bands.

5. The method of claim 1 further comprising:
selecting a third hyperspectral band;
adjusting at least one of: a reflectivity of at least one of the objects or materials in the scene to correspond to reflectivity in the third hyperspectral band, or an emissivity of at least one spectral source in the scene to correspond to the emissivity of the at least one spectral source in the third hyperspectral band;
generating, by rendering, a third spectral frame of the three-dimensional scene; and
assembling the first, second and third spectral frames into the hyperspectral frame.

6. The method of claim 1, further comprising updating the hyperspectral image based on changes to at least one of the objects or materials.

7. The method of claim 1 wherein the generating the three-dimensional scene includes incorporating models for light sources, atmospherics and objects.

8. The method of claim 7, wherein the generating the three-dimensional scene includes assigning materials to the objects.

9. The method of claim 7, further comprising changing at least one of the objects or object models for the second hyperspectral band.

10. The method of claim 1, further comprising:
updating the scene to represent time-varying motion;
selecting another hyperspectral band;
adjusting at least one of: a reflectivity of at least one of the objects or materials in the scene to correspond to reflectivity in the another hyperspectral band, or an emissivity of at least one spectral source in the scene to correspond to the emissivity of the at least one spectral source in the another hyperspectral band;
generating, by rendering, another spectral frame of the three-dimensional scene; and
assembling the first, second and another spectral frames into the hyperspectral frame.

11. The method of claim 10, wherein updating the scene to represent time-varying motion includes at least one of moving, articulating or transforming at least one object in the scene.

12. The method of claim 1, wherein generating materials in the scene is based at least in part on material properties accessed via a database.

13. A method of modeling hyperspectral images, comprising:
using a processor to execute computer executable components stored in a memory to perform the following acts:
generating a three-dimensional scene in a first frame including generating objects and materials in the scene;
selecting a set of hyperspectral bands;
adjusting at least one of a reflectivity of at least one of the objects or materials in the scene to correspond to reflectivity in each of the hyperspectral bands included in the set of hyperspectral bands, or an emissivity of at least one spectral source to correspond to the emissivity of the at least one spectral source in each of the hyperspectral bands included in the set of hyperspectral bands;
generating, by rendering, a spectral frame of the three-dimensional scene for each of the hyperspectral bands included in the set of hyperspectral bands; and
generating, based on the spectral frames, a hyperspectral frame.

14. The method of claim 13 wherein the set of hyperspectral bands include contiguous hyperspectral bands.

15. The method of claim 14 wherein the contiguous hyperspectral bands include at least 16 contiguous hyperspectral bands.

16. The method of claim 13 wherein the generating the three-dimensional scene includes incorporating models for light sources, atmospherics and objects.

17. The method of claim 16 wherein the generating the three-dimensional scene includes assigning materials to the objects.

18. The method of claim 16 further comprising changing at least one of the objects or object models for hyperspectral bands included in the set of hyperspectral bands.

19. The method of claim 13 further comprising updating the scene to represent time-varying motion for a subset of the set of hyperspectral bands.

20. The method of claim 19 wherein updating the scene to represent time-varying motion includes at least one of moving, articulating or transforming at least one object in the scene.

* * * * *